United States Patent [19]
Kumar

[11] Patent Number: 5,925,873
[45] Date of Patent: *Jul. 20, 1999

[54] GRIP HELD AND GRIP OPERABLE DATA ENTRY DEVICE

[75] Inventor: Rajendra Kumar, Akron, Ohio

[73] Assignee: Khyber Technologies Corporation, Fairlawn, Ohio

[*] Notice: This patent is subject to a terminal disclaimer.

[21] Appl. No.: 08/823,508

[22] Filed: Mar. 24, 1997

Related U.S. Application Data

[63] Continuation-in-part of application No. 08/368,036, Jan. 3, 1995, Pat. No. 5,616,906, which is a continuation of application No. 08/096,678, Jul. 23, 1993, abandoned.

[51] Int. Cl.⁶ ...................................................... G06K 7/10
[52] U.S. Cl. .................................. 235/472.02; 235/462.45
[58] Field of Search ...................................... 235/462, 472, 235/454, 469, 467, 462.01, 472.01, 472.02

[56] References Cited

U.S. PATENT DOCUMENTS

| | | | |
|---|---|---|---|
| D. 299,235 | 1/1989 | Feger et al. ............................. | D14/100 |
| D. 340,034 | 10/1993 | Hofstetter et al. ..................... | D14/100 |
| D. 340,239 | 10/1993 | Swartz ................................... | D14/116 |
| 4,005,388 | 1/1977 | Morley et al. ........................ | 340/172.5 |
| 4,158,194 | 6/1979 | McWaters et al. ................... | 340/146.3 |
| 4,916,441 | 4/1990 | Gombrich ............................. | 340/712 |
| 5,294,782 | 3/1994 | Kumar .................................. | 235/462 |
| 5,371,348 | 12/1994 | Kumar et al. .......................... | 235/472 |
| 5,386,106 | 1/1995 | Kumar .................................. | 235/472 |
| 5,418,684 | 5/1995 | Koenck et al. .......................... | 235/472 |
| 5,479,001 | 12/1995 | Kumar .................................. | 235/472 |
| 5,616,906 | 4/1997 | Kumar .................................. | 235/462 |

FOREIGN PATENT DOCUMENTS

0595371  5/1994  European Pat. Off. ............... 235/472

*Primary Examiner*—Thien Minh Le
*Attorney, Agent, or Firm*—Sand & Sebolt

[57] ABSTRACT

A grip held and grip operable data entry device for data collection by an operator having a hand includes a narrow grip unit for entry of data and a housing extension for carrying certain components that would otherwise have to be carried within grip unit, allowing grip unit to be narrow for comfortable and secure gripping without elimination of any desired functionality. Grip unit includes main housing having a first side and a second side, the first housing grasped by the operator's hand with the thumb extending along the first side and the middle finger engaging the second side. A housing extension extends from and is carried by main housing behind the operator's thumb such that operator support for holding device is furnished by the operator's thumb and the operator's middle finger acting upon the first side and the second side of main housing, leaving the index finger free to engage and disengage a push-button. Grip unit eliminates or minimizes operator stress and fatigue, permits holster-type carrier operation, includes at least one automatic identification mechanism such as scanner module, provides full functionality and allows keypad entry in hand held and table-top orientation.

20 Claims, 7 Drawing Sheets

GRIP HELD AND GRIP OPERABLE DATA ENTRY DEVICE

CROSS REFERENCE TO RELATED APPLICATION

This application is a continuation-in-part of application Ser. No. 08/368,036, filed Jan. 3, 1995 now U.S. Pat. No. 5,616,906 which in turn is a continuation of application Ser. No. 08/096,678, filed Jul. 23, 1993, now abandoned.

TECHNICAL FIELD

The present invention relates in general to devices for data collection. More particularly, the present invention pertains to portable devices for data entry and remote automatic identification. More specifically, the present invention relates to hand-held portable devices for data collection suitable for multiple applications including automatic article identification, and data collection and control such as for inventory purposes.

BACKGROUND ART

Portable data collection devices have been developed for a wide variety of applications and are becoming increasingly popular as a cost effective mechanism by which to perform a number of essential business activities such as inventory data collection and control functions such as automatic product identification and price correlation. While the specific features of such devices vary dependent upon the application, nearly all are designed for and require hand-held use. Virtually all such devices include a microprocessor based control unit, and further include or provide for the optional attachment of an electromagnetic (also known as radio frequency identification or RFID), laser or CCD scanner for automatic identification of items on which suitable, corresponding electromagnetic or optical identifiers such as tags or bar-code labels have been placed.

Significantly, these applications require either substantially continuous hand held scanning over extended periods of time, or repetitious operations where the device must be kept with a mobile operator in a holster-like carrier and frequently and rapidly removed for data-entry in the course of a work session. These requirements, in turn, mandate that the device be as comfortable as possible to minimize fatigue and stress, be sufficiently small to fit within and quickly removed from a holster, and include all desired functionality such as scanning, keypad data entry while hand held and when the device is on a table or desktop, display, radio frequency and modem communications, and long-term battery operation.

These efforts to fulfill such diverse needs have been varied and may be broadly classified as those which electrically connect a physically separate scanner, and those that include the same within the device. In the former instance, exemplified by U.S. Pat. No. 5,023,824, both hands are required for scanning, one to hold the device and the other to hold and operate the scanner. In the latter instance, the components necessary to furnish the required functionality have resulted in devices so wide, heavy and/or out-of-balance as to be stressful and fatiguing to hold for lengthy times, and difficult or impossible to position for successful scanning or employ in holstering operations. Devices having one or more of these limitations may be found in U.S. Pat. Nos. 4,621,189; 4,758,717; 4,983,818; D320,013; D325,574; and the Model BHT-2000 Bar-code Handy Terminal made commercially available in the United States by the Nippondenso ID Systems division of Toyota Tsusho America Inc. of San Mateo, Calif.

SUMMARY OF THE INVENTION

It is, therefore, an object of the present invention to provide a hand held device for data collection by an operator that is comfortable to hold and operate for lengthy times with no or minimal stress and fatigue.

It is another object of the present invention to provide a device, as set forth above, that may fit within and be quickly removed from a holster-type carrier.

It is still another object of the present invention to provide a device, as set forth above, that provides full functionality required by the application, including at least one means for automatic identification such as a CCD, laser or electromagnetic scanner.

It is yet another object of the present invention to provide a device, as set forth above, that is comfortably positionable for operator scanning.

It is a further object of the present invention to provide a device, as set forth above, whose orientation facilitates keypad data entry by the operator when the device is positioned upon a table or desktop.

These and other objects and advantages of the present invention over existing prior art forms will become more apparent and fully understood from the following description in conjunction with the accompanying drawings.

In general, in accordance with the present invention, a portable, handheld device for data collection by an operator includes a grip unit for entry of data, and a second housing. The grip unit includes a first housing having a first side and a second side, the first housing grasped by the operator's hand with the thumb extending along the first side and a second finger engaging the second side. A second housing extends from and is carried by the first housing partially adjacent the operators thumb such that operator support for holding the device is furnished by the operator's thumb acting upon the first side of the first housing and the operators second finger acting upon the second side of the first housing.

BRIEF DESCRIPTION OF THE DRAWINGS

Similar numerals refer to similar parts throughout the drawings.

PREFERRED EMBODIMENT FOR CARRYING OUT THE INVENTION

Figure 1:
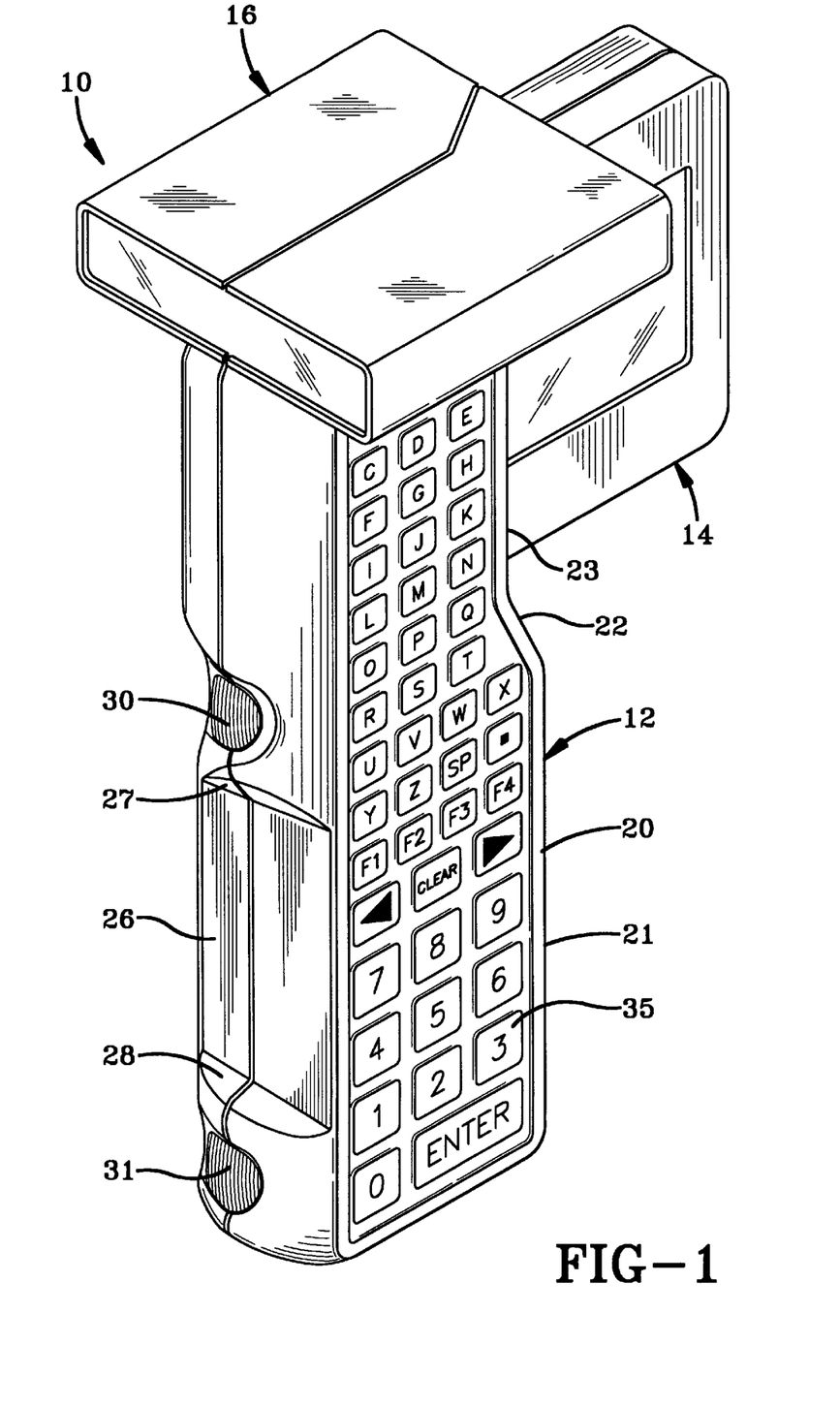
FIG. 1 is a perspective view of an exemplary device in accordance with the present invention depicting a grip held and operable data entry device with an extension housing including a display and a scanner positioned atop the device.

FIG. 1 presents in perspective an exemplary portable device in accordance with the present invention, generally indicated by the numeral 10, for data collection by an operator. Corresponding front, top, rear, bottom, left side and right side views of device 10 are shown in FIGS. 2–7, respectively. Device 10 broadly includes a grip held data entry unit 12 (hereinafter grip unit 12) having a housing extension 14, and a scanner module 16 carried by grip unit 12.

Figure 2:
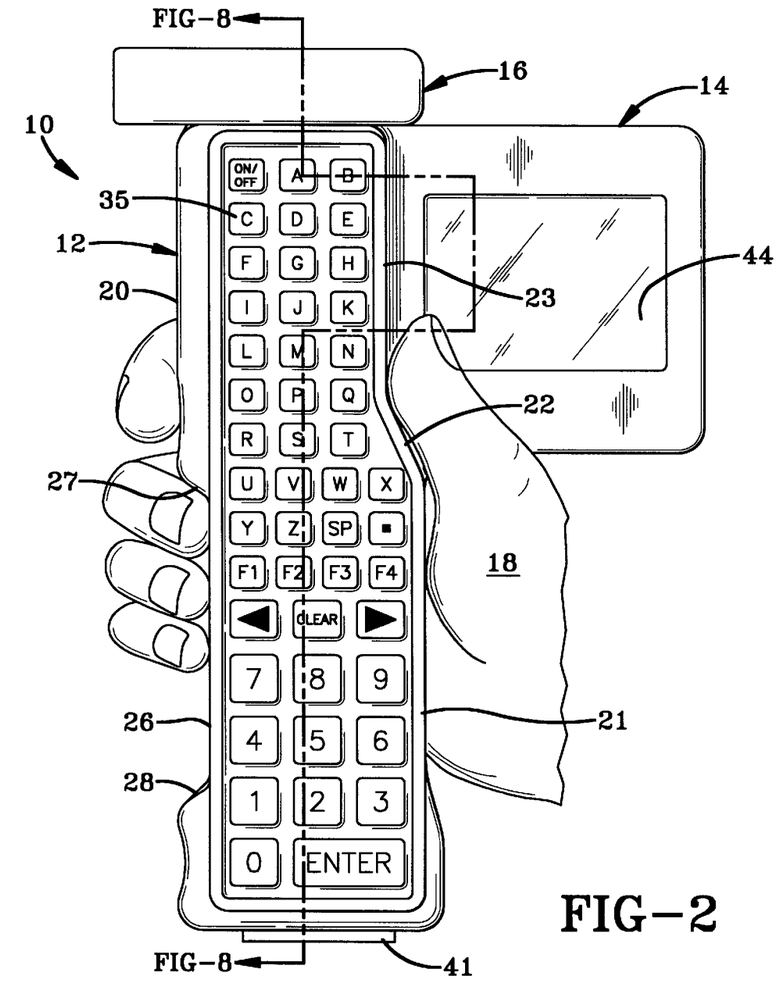
FIG. 2 is a front view of the device shown in FIG. 1, depicting a users right hand gripping the device in an exemplary manner.
Figure 3:
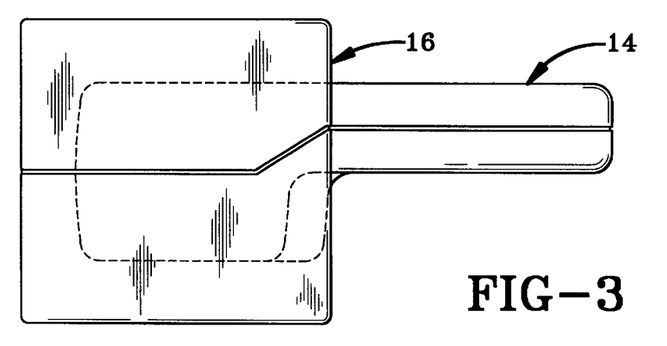
FIG. 3 is a top view of the device shown in FIG. 1.
Figure 4:
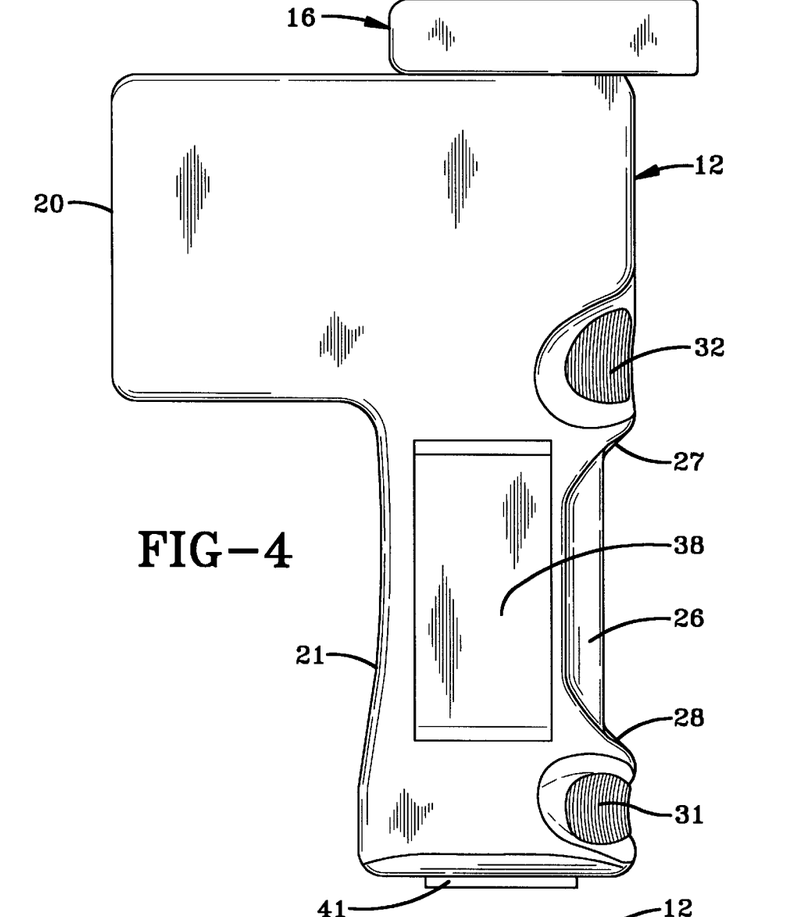
FIG. 4 is a rear view of the device shown in FIG. 1.
Figure 5:
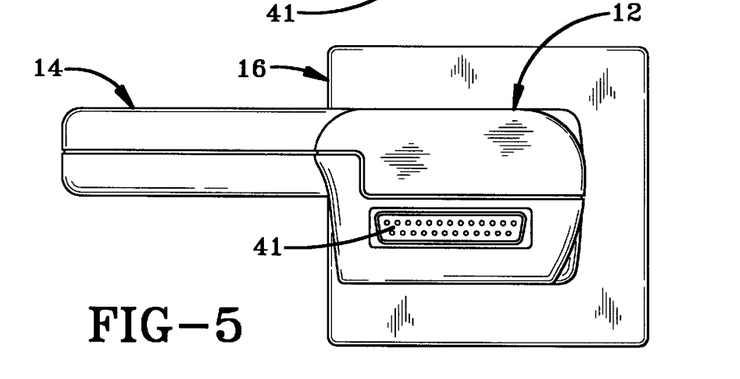
FIG. 5 is a bottom view of the device shown in FIG. 1 showing an optional input/output connector.

The nature of grip unit 12 may be best understood by reference to FIG. 2 where the right hand 18 of an operator is shown comfortably grasping grip unit 12. In accordance with the present invention, grip unit 12 is to be kept sufficiently narrow to allow such hand holding, and, as hereinafter more fully explained, allow balanced operation, permit grip unit 12 to fit within an operator carried holster, and lay flat on horizontal surfaces in an upright position, with all desired functionality in device 10. Inasmuch as the operator's hand does not envelope grip unit 12, grip unit 12 may be made sufficiently deep to carry those components selected to be placed therein.

Figure 6:
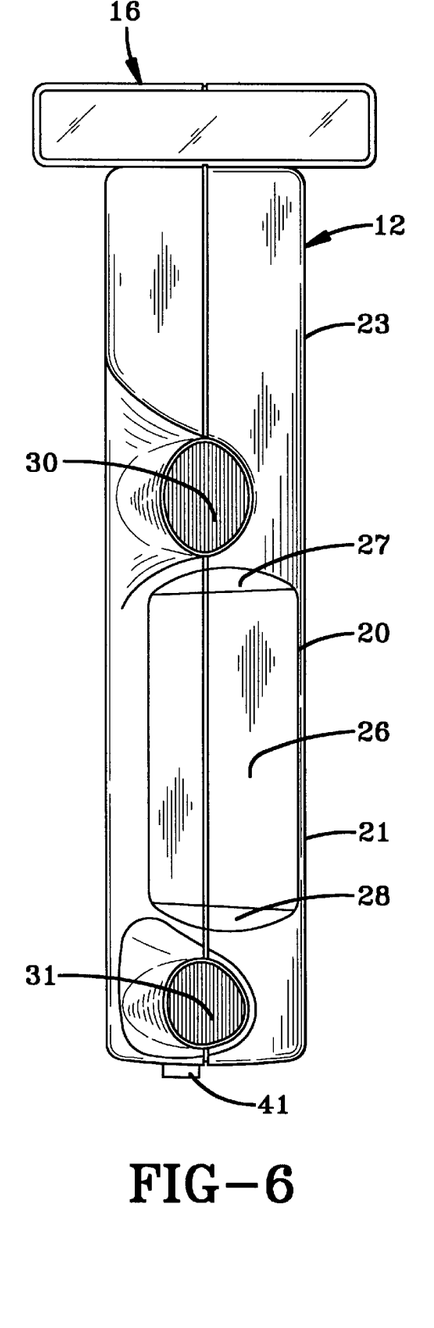
FIG. 6 is a left side view of the device shown in FIG. 1.

Grip unit 12 includes a main housing 20 having a top 20a which may be formed by molding or other acceptable means of a suitable material such as a rigid plastic suitable to integrally carry the desired components in a substantially rectangular block that may be seen in FIG. 2 to have a somewhat wider lower portion 21 that tapers at a segment 22 along the right side thereof at slightly above its center to a somewhat narrower upper portion 23. The right side and top of grip unit 12 are preferably substantially planar, while the bottom and left side thereof are contoured with more rounding, except (as best seen in FIG. 6) at a segment 26 centrally disposed along the left side of lower portion 21 where the left side is also without contouring and substantially planar. Top and bottom ridges 27,28 reduce the left side contouring to planar segment 26. A contoured upper trigger push-button 30 and a similarly contoured lower trigger push-button 31 may be integrally formed in the left side of grip unit 12 and disposed above and below planar segment 26.

In this manner, as best seen in FIG. 2, the operator's hand 11 may comfortably grasp grip unit 12 with the thumb extending along tapered segment 22, the tip of the middle finger disposed against top ridge 27 at the top of planar segment 26, the tip of the index finger positioned over push-button 30, and the remaining fingers positioned upon segment 26 below the middle finger. In this configuration, the index finger does not support device 10 and is free to press or release push-button 30 as desired; indeed, device 10 may be supported solely by the operator's thumb and middle finger. Optimal hand placement around device 10 may be encouraged by marking the right side of housing where the thumb is to engage (see FIG. 8), and by contouring the lower portion of right side 21.

Figure 8:
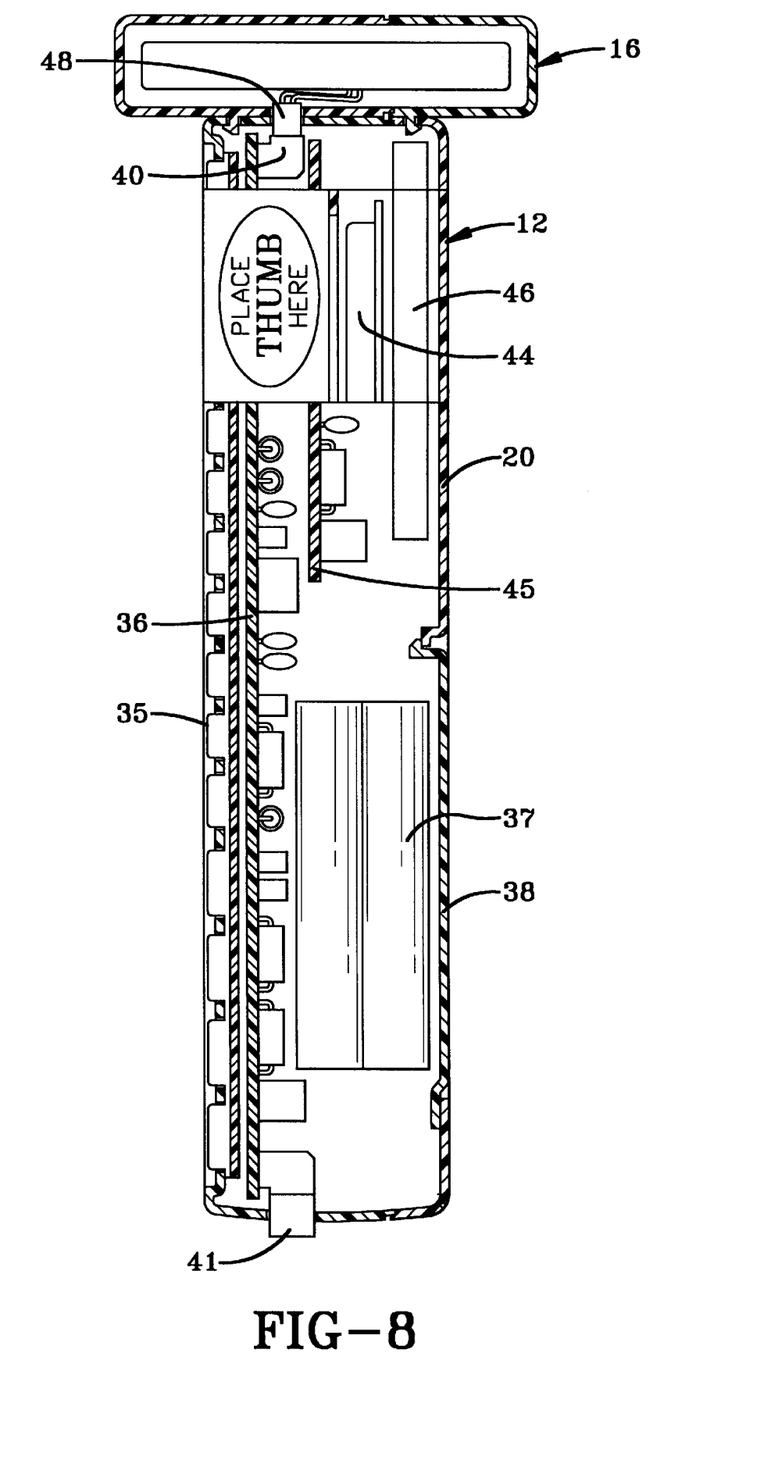
FIG. 8 is a vertical section view of the device shown in FIG. 1 taken substantially along line 8—8 shown in FIG. 2.

FIG. 8 presents a vertical section of device 10 shown in FIG. 1 taken substantially along line 8—8 of FIG. 2 that depicts one possible combination of components for data entry device 10 and their distribution between grip unit 12 and housing extension 14. In FIG. 8 main housing 20 may be seen to include a data entry keypad 35 extending out the front of device 10, such as a keyboard with raised, travel-tactile keys or a substantially flat membrane keyboard having a mylar, customizable, user-interchangeable keypad cover suitable for entry of the desired information and device commands, a main processor printed circuit board 36, a battery compartment 37 and battery compartment door 38 reclosably formed in the rear of main housing 20, scanner connector socket 40, and an auxiliary input/output (I/O) data connector socket 41.

Figure 7:
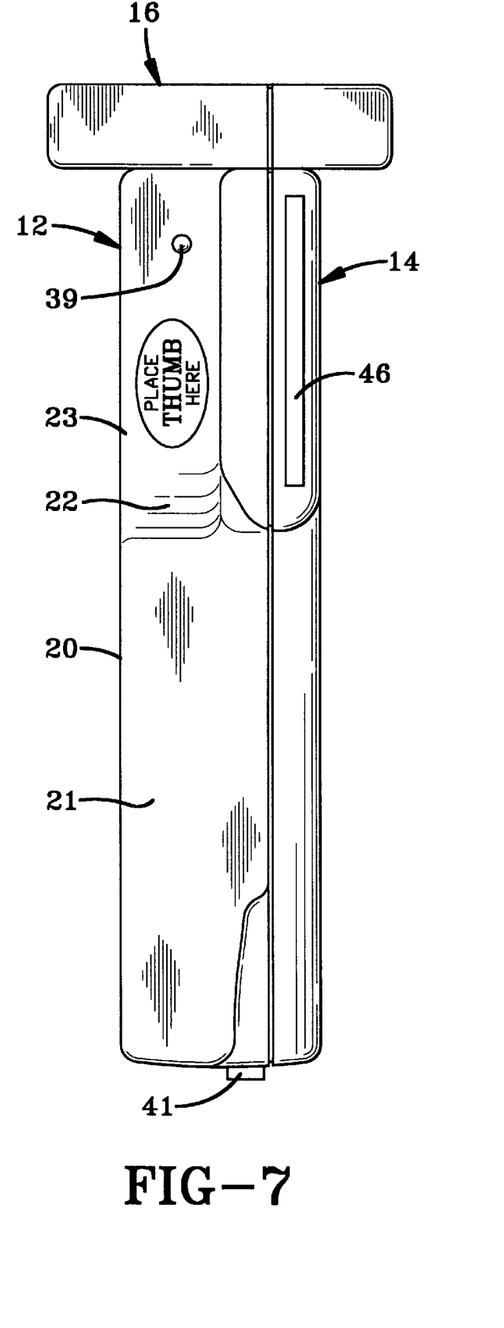
FIG. 7 is a right side view of the device shown in FIG. 1.

Scanner connector socket 40 is preferably mounted to printed circuit board 36 and extend through the top 20a of main housing 20 to receive a scanner connector plug 48 extending from the bottom of scanner module 16 for mating engagement therewith when scanner module 16 is secured atop main housing 20 as hereinafter explained. I/O data connector 41 (such as a conventional RS-232 serial connector) may be similarly mounted to printed circuit board 36 and extend through the bottom of main housing 20 to receive a corresponding connector plug. Where one or more operational status lights such as LED 39 is desired, it may be optimally visible if placed, as illustrated in FIG. 7, on the right side of the narrower upper portion 23 of housing 20 in front of housing extension 14 and above where housing 20 is gripped, as explained further hereinbelow.

Housing extension 14 may be seen in FIG. 8 to include a display 44, secondary printed circuit board 45, and a PCMCIA slot 46, all of which are conventionally available.

It is the volumetric expansion of device 10 by inclusion of housing extension 14 and the placement of certain components that would otherwise have to be carried within grip unit 12, that permits grip unit 12 to be narrow for comfortable and secure gripping without elimination of any desired functionality. Housing extension 14, which may be formed in the same manner and of the same material as that of grip unit 12, in the pictured embodiment is substantially rectangular and extends substantially perpendicularly from the top right side of grip unit 12, as illustrated best in FIG. 7. The rear of housing extension 14 is planar with the rear of grip unit 12, and extends forward with a thickness that allows adequate space for positioning of the thumb, as described hereinabove. Significantly, the corner of housing extension 14 closest to tapered segment 22 may act as a backstop for the thumb and further stabilize and balance the operator's grip of device 10. Examples of other space consuming components that may be placed in housing extension 14 include a radio transceiver; a modem; and memory, input/output and software expansion card slots 46 such as those conforming to the more recently popular PCMCIA standards.

Device 10 allows for inclusion of up to three automatic identification mechanisms. The previously noted scanner module 16 may include two flexible anchors for removably securing the same to the top of main housing 20. A second automatic identification device, such as a boom antenna for RFID, may be mounted upon or integrally formed with the left side of main housing 20 in the contoured area above upper trigger push-button 30. A third automatic identification device may be interconnected through the I/O data connector socket 41 secured to the bottom of main housing 20.

The inclusion of lower trigger push-button 31 allows device 10 to be optimally configured and operated with a left-hand. In this instance main housing 20 is held "upside-down" from the orientation shown in FIG. 2 with the middle finger acting against bottom ridge 28. Moreover, full functionality can be preserved by reversing the text on the keys (such as with an upside-down overlay) and turning upside-down the image on the display (such as with modified display driver software).

Figure 9:
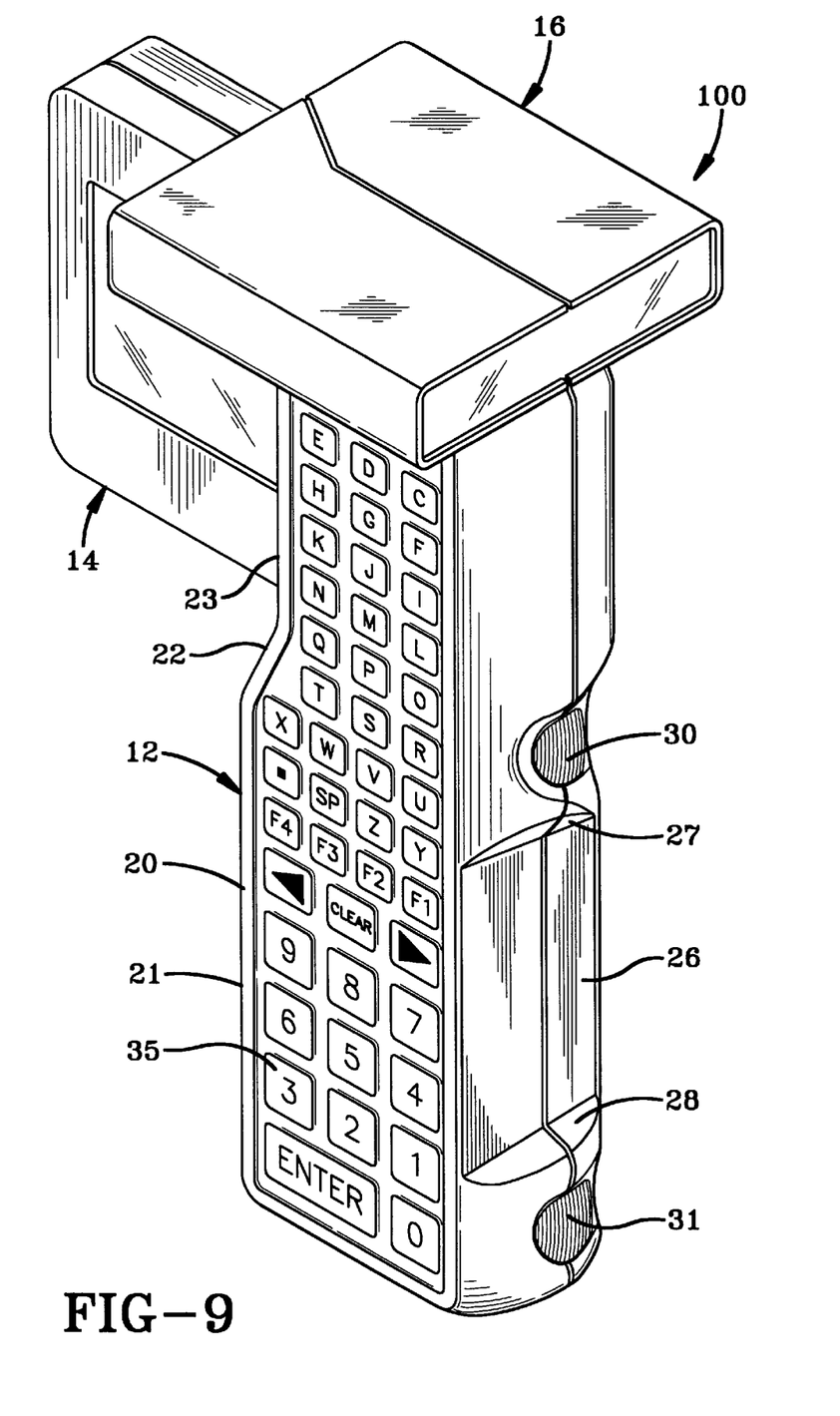
FIG. 9 is a perspective view of a second embodiment of the device in accordance with the present invention depicting a grip held operable data entry device adapted to be positioned within a user's left hand.
Figure 10:
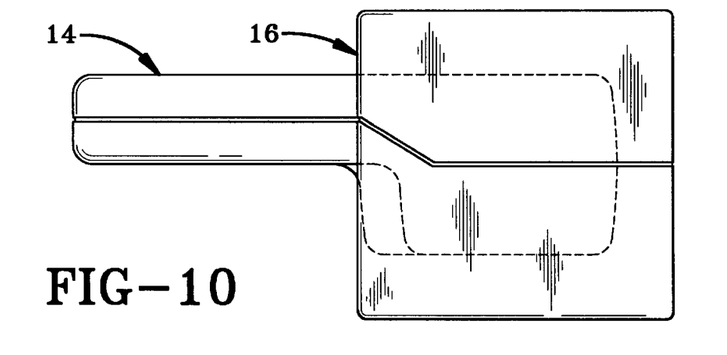
FIG. 10 is a top view of the device shown in FIG. 9.
Figure 11:
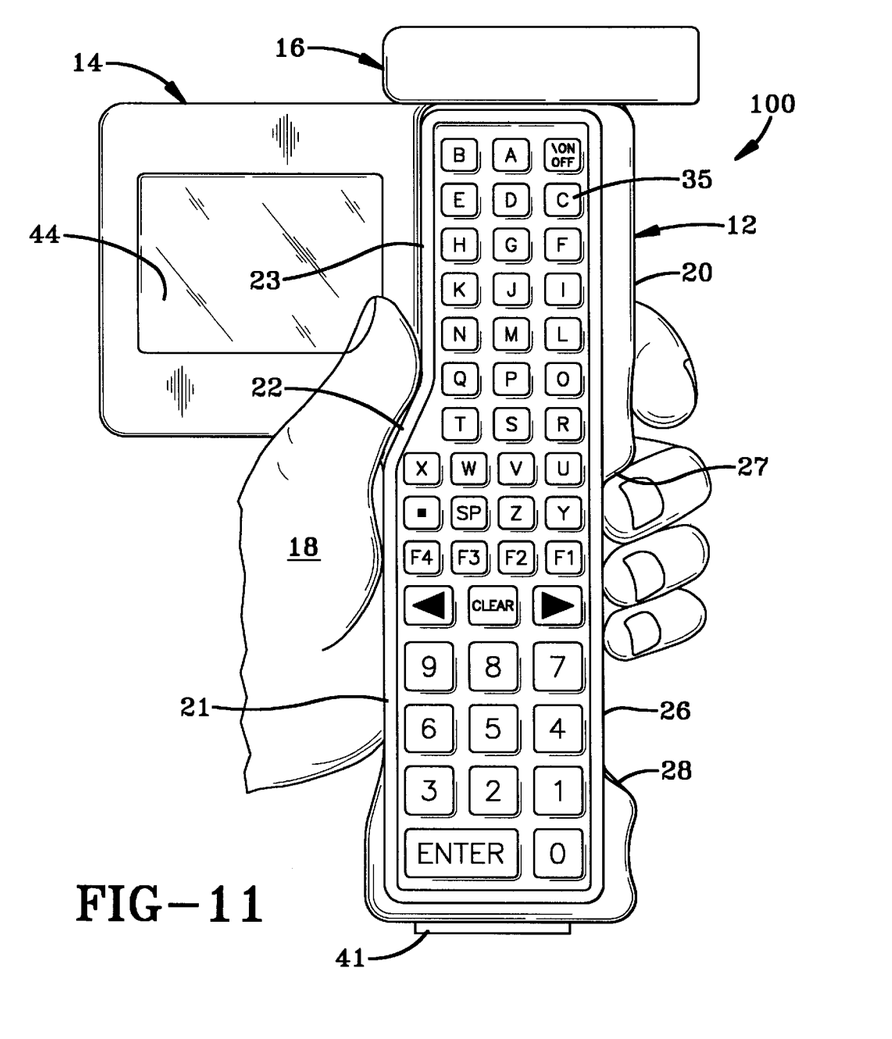
FIG. 11 is a front view of the device shown in FIG. 9, depicting a user's left hand gripping the device.

A second embodiment of the present invention is shown generally in FIGS. 9–11 and is indicated generally at 100.

Device 100 is identical to device 10 except that it is adapted to be held in the user's left hand rather than the user's right hand. More particularly, the nature of device 100 may best be understood by reference to FIG. 9 where the left hand of an operator is shown comfortably grasping grip unit 12. Just as with device 10, grip unit 12 is to be kept sufficiently narrow to allow such hand holding end, as hereinbefore more fully explained, allows balanced operation, permit group unit 12 to fit within an operator's carrier holster, and lay flat on horizontal surfaces in an upright position. Additionally, everything as described with respect to the right side of device 10 is included on the left side of device 100, and everything described hereinabove with respect to the left side of device 10 is included on the right side of device 100. As such, device 100 is merely a mirror image of device 10 and permits device 100 to be comfortably held in the upright position in the left hand, and in the upside down position in the right hand.

The skilled artisan will understand that housing extension 14 may have a shape that more readily corresponds to that of its components or otherwise so long as it extends behind the position on the side of main housing 20 where the operator's thumb is to be placed.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of portable data collection and, more particularly, grip held and operable data entry devices.

I claim:

1. A portable, hand-held device for data collection by an operator, comprising:
    a housing having a top and a bottom, a first side having a grasping portion and a second side extending between a front and a rear and said top and bottom;
    a housing extension extending outwardly from the first side of the housing and between the top and bottom and having said front located beneath the top of the housing and lying along and beyond the grasping portion of said housing whereby the hand-held device is adapted to be grasped by the operators hand with the operators thumb extending along a grasping portion of the first side of the housing, the operators second finger engaging the second side, opposite said first side, such that the operators thumb and second finger secure the hand-held device against sideways movement, whereby the operators hand acts against the rear of the hand-held device, and the operators thumb acts on the front of the housing extension when the device is received in the operator's left hand such that the operator's hand and thumb secure the hand-held unit against movement toward and away from the users hand; and
    said front of the housing extension communicating with the first side of the housing intermediate the front and rear of said housing.

2. A portable, hand-held device for data collection as defined in claim 1, in which a portion of the grasping portion extends between the front of the housing and the front of the housing extension.

3. A portable, hand-held device for data collection as defined in claim 1, in which the housing extension includes a lower edge whereby the lower edge is adapted to extend between the base of the user's thumb and the base of the user's second finger with the user's hand intermediate when the portable, hand-held device is grasped by the operator's hand.

4. A portable, hand-held device for data collection by an operator, as set forth in claim 1, in which said grasping portion of said housing includes a linear portion extending between the front of the housing and the front of the housing extension, and a tapered segment inclined toward the top and adapted to be engaged by the operator's thumb, which tapered segment communicates with said linear portion.

5. A portable, hand-held device for data collection by an operator, as set forth in claim 4, in which the second side includes a contoured portion and a planar segment; in which a first ridge extends between the contoured portion and a first end of the planar segment; and in which the first ridge is adapted to engage the operator's second finger.

6. A portable, hand-held device for data collection by an operator, as set forth in claim 5, further comprising push-button means for operating the device; and in which the push-button means is carried by the second side.

7. A portable, hand-held device for data collection by an operator, as set forth in claim 6, in which the planar segment includes a second end, and further including a second ridge extending between said second end and said contoured portion; and in which the second ridge is adapted to be engaged by an operator's second finger when the device is held upside-down.

8. A portable, hand-held device for data collection by an operator, as set forth in claim 3, further comprising at least one item identification means attached to the housing for automatic identification of an item.

9. A portable, hand-held device for data collection by an operator, as set forth in claim 8, in which said scanner for automatic identification is a barcode scanner.

10. A portable, hand-held device for data collection by an operator, as set forth in claim 8, in which the scanner for automatic identification is a radio frequency identification scanner.

11. A portable, hand-held device as defined in claim 3, further comprising a radio frequency identification scanner and a barcode scanner, both attached to the housing.

12. A portable, hand-held device as defined in claim 11, in which the barcode scanner is carried by the housing adjacent the top; and in which the radio frequency identification scanner extends outwardly from the second side of the housing.

13. A portable, hand-held device for data collection by an operator, as set forth in claim 3, in which a keyboard is carried by the housing and visible to the operator from said front of said housing for inputting data; and in which the housing extension carries a display visible to the operator from the front of said housing extension.

14. A portable, hand-held device for data collection by an operator, as defined in claim 3, in which the housing extension includes a PCMCIA slot.

15. A portable, hand-held device for data collection as defined in claim 8 in which the item identification means for automatic identification is a scanner mounted to one of the housing top or the housing bottom.

16. A portable, hand-held device for data collection by an operator, comprising:
    a housing having a first side, a second side and a front; said first side including a grasping portion adapted to receive the operator's thumb;
    a housing extension extending outwardly from the first side of the housing;

said housing extension having a front lying along and beyond the grasping portion of the housing whereby the operator's thumb lies adjacent the grasping portion of the housing, and a front of the housing extension; and said second side of the housing having a formed portion complementary shaped to accommodate a portion of the operator's fingers whereby the housing may only be grasped by the operator's right hand when said first side is oriented right as the operator views the front of the housing and housing extension, and said housing may only be grasped by the operator's left hand when the first side is oriented left as the operator views the front of the housing and housing extension.

17. A portable, hand-held device for data collection as defined in claim 16, in which the housing has a top and a bottom; in which the housing extension extends outwardly from the first side of the housing and between the top and bottom having a front located beneath the top of the first housing and lying along and beyond the grasping portion of said housing whereby the operator's thumb lies adjacent said front of said housing extension when extending along said grasping portion of the housing; and the front of the housing extension communicates with the first side of the housing intermediate the front and rear of said housing.

18. A portable, hand-held device for data collection by an operator, as set forth in claim 17, further comprising push-button means for operating the device; and in which the push-button means is carried by the second side.

19. A portable, hand-held device for data collection by an operator, as set forth in claim 18, further comprising item identification means attached to the housing for automatic identification of an item.

20. A portable, hand-held device for data collection by an operator, as set forth in claim 19, further comprising key means carried by said housing and visible to the operator from said front of said housing for inputting data; and in which the housing extension carries a display visible to the operator from the front of said housing extension.

* * * * *